(12) United States Patent
Huang et al.

(10) Patent No.: US 12,014,546 B2
(45) Date of Patent: Jun. 18, 2024

(54) MULTIMODAL METHOD FOR DETECTING VIDEO, MULTIMODAL VIDEO DETECTING SYSTEM AND NON-TRANSITORY COMPUTER READABLE MEDIUM

(71) Applicant: INSTITUTE FOR INFORMATION INDUSTRY, Taipei (TW)

(72) Inventors: Chu-Chun Huang, Taipei (TW); Yen-Heng Tsao, Taipei (TW); Ping-I Chen, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 371 days.

(21) Appl. No.: 17/456,375

(22) Filed: Nov. 23, 2021

(65) Prior Publication Data

US 2023/0135866 A1 May 4, 2023

(30) Foreign Application Priority Data

Nov. 3, 2021 (TW) ................................. 110141032

(51) Int. Cl.
*G06V 20/40* (2022.01)
*G06F 16/74* (2019.01)
(Continued)

(52) U.S. Cl.
CPC ............ *G06V 20/46* (2022.01); *G06F 16/743* (2019.01); *G06F 16/7844* (2019.01);
(Continued)

(58) Field of Classification Search
CPC .... G06V 20/46; G06V 40/176; G06V 40/164; G06V 40/20; G06F 16/743; G06F 16/7844; G06F 40/30
See application file for complete search history.

(56) References Cited

U.S. PATENT DOCUMENTS 5,835,667 A * 11/1998 Wactlar ................. G06F 16/785
386/338
2014/0163957 A1 * 6/2014 Tesch ..................... G06F 40/30
704/9

FOREIGN PATENT DOCUMENTS

TW      201220099 A1    5/2012
TW      201717062 A     5/2017

OTHER PUBLICATIONS

The office action of the corresponding Taiwanese application No. TW110141032 issued on Jun. 13, 2022.

* cited by examiner

*Primary Examiner* — David F Dunphy
(74) *Attorney, Agent, or Firm* — CKC & Partners Co., LLC (57) ABSTRACT

A multimodal method for detecting video includes following step of: receiving a message to be detected to obtain a multimodal association result, which message to be detected corresponds to a video to be detected; generating a plurality of detecting conditions according to multimodal association result; searching a plurality of videos in a video detection database to obtain a target video in videos according to detecting conditions, which each of videos includes a plurality of video paragraphs respectively, which each of video paragraphs includes a piece of multimodal related data respectively; comparing detecting conditions and piece of multimodal related data of video paragraphs to obtain a matching video paragraph and using video corresponding to matching video paragraph as the target video; and outputting the target video and the video to be detected to a display device for display.

16 Claims, 3 Drawing Sheets

(51) Int. Cl.
*G06F 16/783* (2019.01)
*G06F 40/30* (2020.01)
*G06V 40/16* (2022.01)
*G06V 40/20* (2022.01)

(52) U.S. Cl.
CPC ............ *G06F 40/30* (2020.01); *G06V 40/164* (2022.01); *G06V 40/176* (2022.01); *G06V 40/20* (2022.01)

MULTIMODAL METHOD FOR DETECTING VIDEO, MULTIMODAL VIDEO DETECTING SYSTEM AND NON-TRANSITORY COMPUTER READABLE MEDIUM

CROSS-REFERENCE TO RELATED APPLICATION

This application claims priority to Taiwan Application Serial Number 110141032, filed on Nov. 3, 2021, which is herein incorporated by reference in its entirety.

BACKGROUND

Field of Invention

The present disclosure relates to a method and a system for detecting a video. More particularly, the present disclosure relates to a multimodal method for detecting a video, a multimodal video detecting system, and a non-transitory computer readable medium.

Description of Related Art

In past, false information was dominated by text. However, in recent years, a large number of false information has appeared in videos and pictures. Detections of whether videos are false information mainly rely on manual processing. Detection process includes selection of suspicious videos from manual inspection. Then possible similar videos are searched for and downloaded from an Internet or a database. Each of video paragraphs or frames of similar videos is manually viewed one by one, and is confirmed whether suspected videos have been altered. Whole process consumes resources such as labor and time.

For the foregoing reason, there is a need to provide other suitable method for detecting a video to solve the problems of the prior art.

SUMMARY

One aspect of the present disclosure provides a multimodal method for detecting a video. The multimodal method for detecting the video includes following steps: receiving a message to be detected so as to obtain a multimodal association result by a processor, which the message to be detected corresponds to a video to be detected; generating a plurality of detecting conditions according to the multimodal association result by the processor; searching a plurality of videos in a video detection database so as to obtain a target video in the plurality of videos according to the plurality of detecting conditions by the processor, which each of the plurality of videos includes a plurality of video paragraphs respectively, which each of the plurality of video paragraphs includes a piece of multimodal related data respectively, and comparing the plurality of detecting conditions and the piece of multimodal related data of the plurality of video paragraphs so as to obtain a matching video paragraph and using a video corresponding to the matching video paragraph as the target video by the processor; and outputting the target video and the video to be detected to a display device for display by the processor.

Another aspect of the present disclosure provides a multimodal video detecting system. The multimodal video detecting system includes a memory and a processor. The memory is configured to store a plurality of instructions. The processor is coupled to the memory. The processor is configured to read the plurality of instructions to perform the following steps: receiving a message to be detected so as to obtain a multimodal association result, which the message to be detected corresponds to a video to be detected; generating a plurality of detecting conditions according to the multimodal association result; searching a plurality of videos in a video detection database so as to obtain a target video in the plurality of videos according to the plurality of detecting conditions, which each of the plurality of videos includes a plurality of video paragraphs respectively, which each of the plurality of video paragraphs includes a piece of multimodal related data respectively, and comparing the plurality of detecting conditions and the piece of multimodal related data of the plurality of video paragraphs so as to obtain a matching video paragraph and using a video corresponding to the matching video paragraph as the target video; and outputting the target video and the video to be detected to a display device for display.

Another aspect of the present disclosure provides a non-transitory computer readable medium. The non-transitory computer readable medium includes a computer program, and is configured to perform a multimodal method for detecting a video. The multimodal method for detecting the video includes: receiving a message to be detected so as to obtain a multimodal association result by a processor, which the message to be detected corresponds to a video to be detected; generating a plurality of detecting conditions according to the multimodal association result by the processor; searching a plurality of videos in a video detection database so as to obtain a target video in the plurality of videos according to the plurality of detecting conditions by the processor, which each of the plurality of videos includes a plurality of video paragraphs respectively, which each of the plurality of video paragraphs includes a piece of multimodal related data respectively, and comparing the plurality of detecting conditions and the piece of multimodal related data of the plurality of video paragraphs so as to obtain a matching video paragraph and using a video corresponding to the matching video paragraph as the target video by the processor; and outputting the target video and the video to be detected to a display device for display by the processor.

These and other aspects of the present disclosure will become apparent from the following description of the preferred embodiment taken in conjunction with the following drawings, although variations and modifications therein may be effected without departing from the spirit and scope of the novel concepts of the disclosure.

It is to be understood that both the foregoing general description and the following detailed description are by examples, and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise.

Furthermore, it should be understood that the terms, "comprising", "including", "having", "containing", "involving" and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

Figure 1:
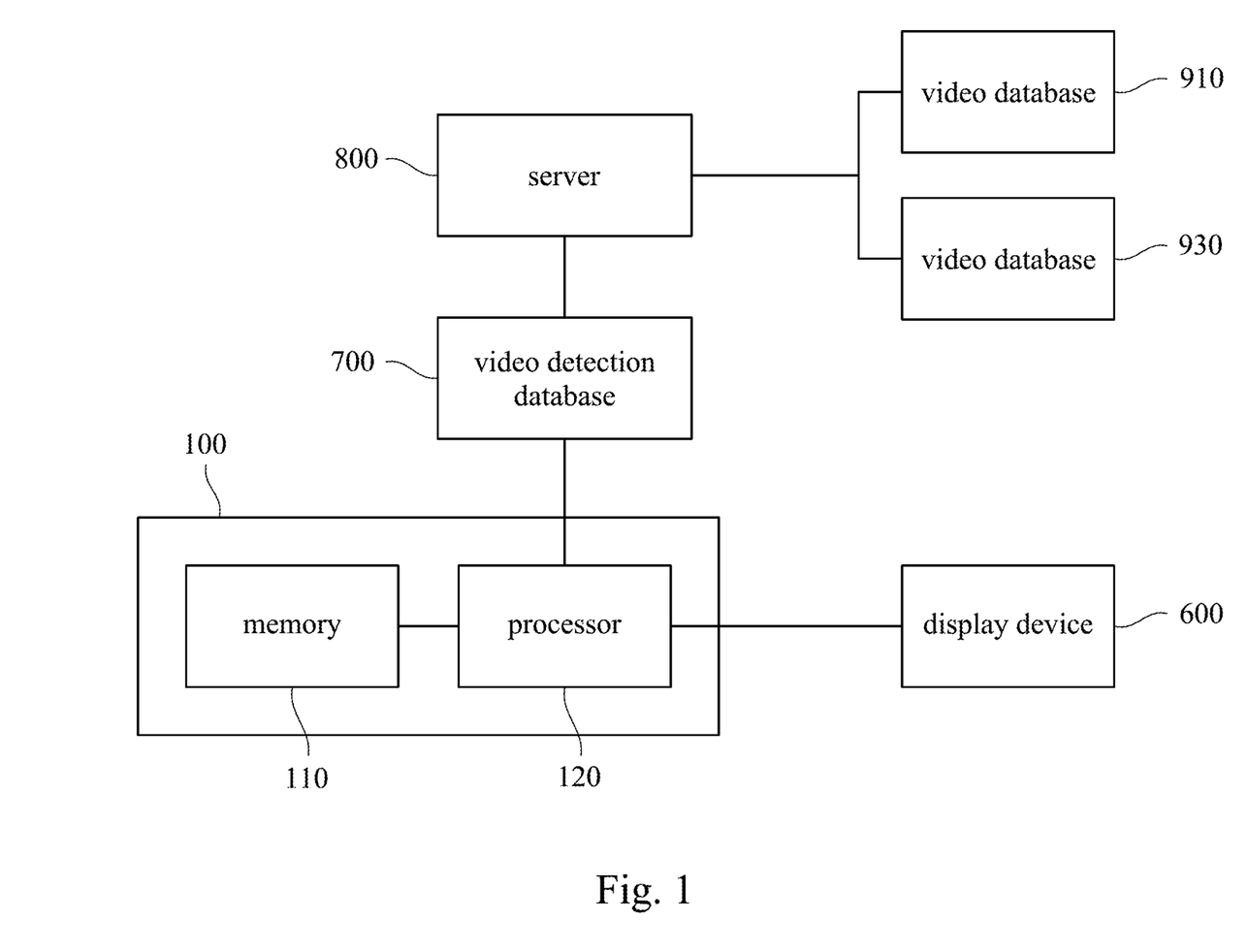
FIG. 1 depicts a schematic diagram of a multimodal video detecting system according to one embodiment of the present disclosure.

FIG. 1 depicts a schematic diagram of a multimodal video detecting system 100 according to one embodiment of the present disclosure. In some embodiments, please refer to FIG. 1, the multimodal video detecting system 100 includes a memory 110 and a processor 120. In some embodiments, the multimodal video detecting system 100 is coupled to a display device 600 and a video detection database 700. The video detection database 700 is coupled to a server 800. The server 800 is coupled to a video database 910 and a video database 930. In some embodiments, for example, the video database 910 may be a Google database. For example, the video database 930 may be a YouTube database. In some embodiments, the aforementioned databases can also be video databases or video sources built by individuals or companies.

In some embodiments, the memory 110 can include flash memories, hard disk drivers (HDD), solid state drives (SSD), dynamic random access memories (DRAM), or static random access memories (SRAM). The memory 110 is configured to store instructions.

In some embodiments, the processor 120 includes but not limited to a single processor and the integration of many micro-processors, for example, central processing units (CPU) or graphic processing units (GPU). The processor 120 is configured to read the instructions in the memory 110.

Figure 2:
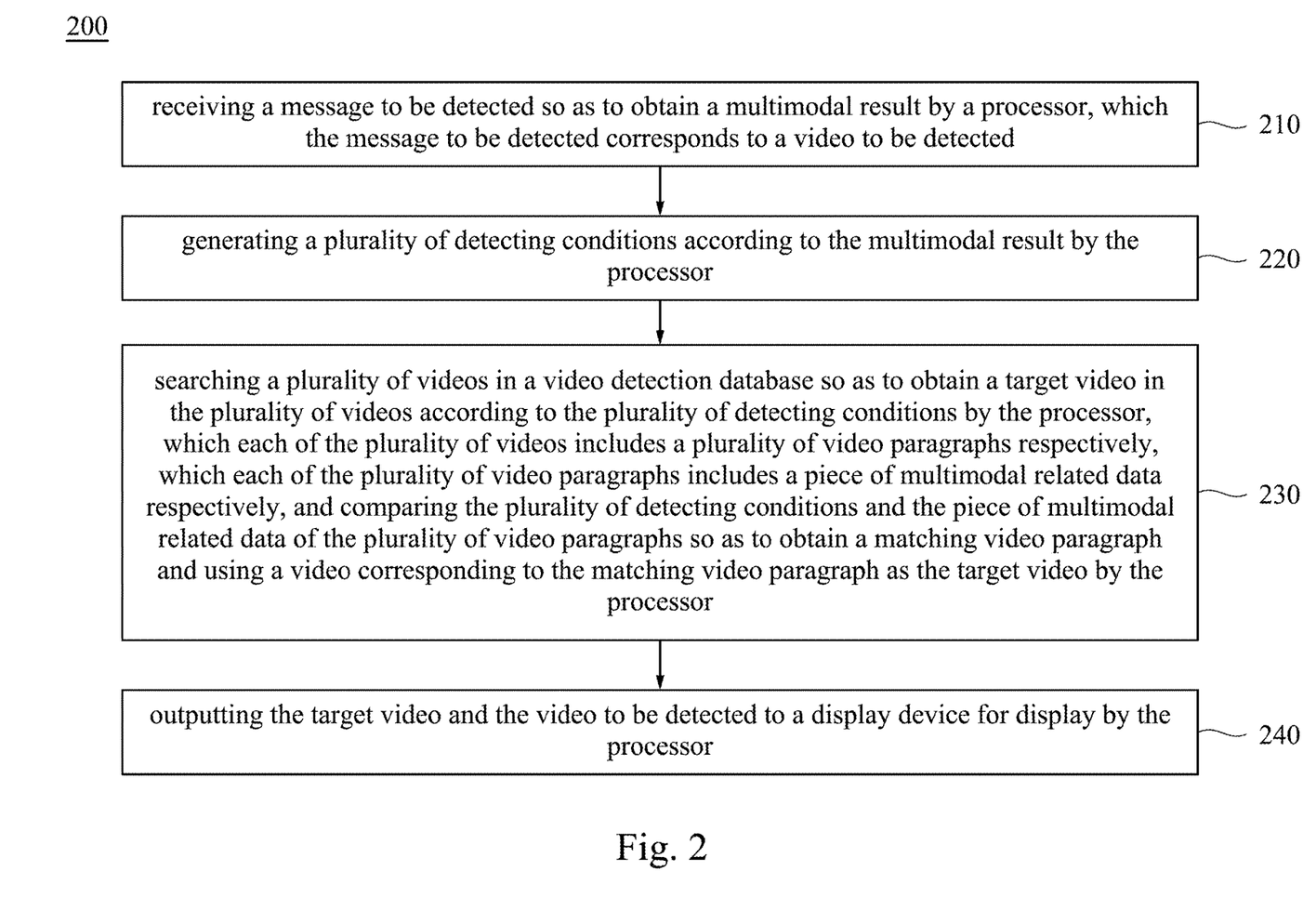
FIG. 2 depicts a flow chart of a multimodal method for detecting a video according to one embodiment of the present disclosure.
Figure 3:
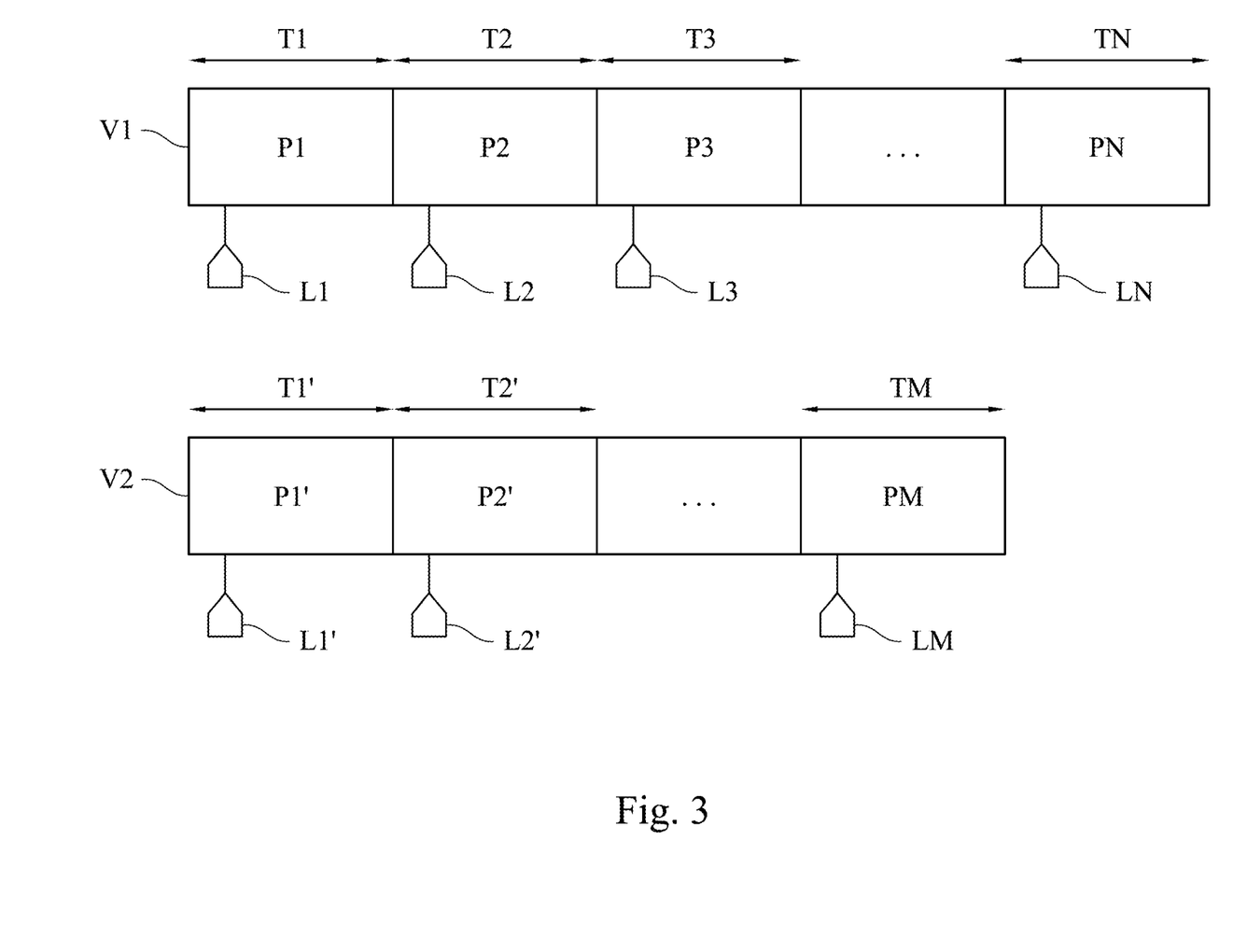
FIG. 3 depicts a marking state of pieces of multimodal related data of video paragraphs of videos according to one embodiment of the present disclosure.

In some embodiments, in order to facilitate the understanding of an operation of the multimodal video detecting system 100, please refer to FIG. 2 to FIG. 3 together. FIG. 2 depicts a flow chart of a multimodal method 200 for detecting a video according to one embodiment of the present disclosure. FIG. 3 depicts a marking state of pieces of multimodal related data of video paragraphs of videos according to one embodiment of the present disclosure.

In some embodiments, please refer to FIG. 1 to FIG. 2, as shown in step 210, the processor 120 of the multimodal video detecting system 100 is configured to receive a message to be detected so as to obtain a multimodal association result. The message to be detected corresponds to a video to be detected. However, it must be explained that the step 210 of present disclosure is not limited to being executed by the multimodal video detecting system 100 shown in FIG. 1. In some embodiments, the step 210 of present disclosure can be executed by other suitable systems or devices.

In some embodiments, the aforementioned video to be detected refers to any videos reported by a general public on the internet that are suspected of alteration, or any videos that are suspected of alteration and need to be tested. The aforementioned multimodal association result is a result of the processor learning a correlation between a language modality and a visual modality after the processor 120 is configured to analyze the language modality and the visual modality in the video to be detected. It is further explained that modal types of modalities (e.g. the language modality and the visual modality) analyzed and learned by the processor 120 are not limited to the embodiment of this case.

In some embodiments, the aforementioned message to be detected further includes a natural language text paragraph corresponding to the video to be detected. The processor 120 of the multimodal video detecting system 100 is configured to receive the video to be detected and the natural language text paragraph corresponding to the video to be detected to obtain the multimodal association result. It should be noted that the natural language text paragraph refers to a text narrative entered by an inspector based on video film to be detected. To further illustrate, by analyzing the video to be detected and the natural language text paragraph at the same time, the processor 120 compensates for the lack of analyzing only the video to be detected or only the natural language text paragraphs corresponding to the video to be detected so as to generate more accurate detecting conditions. The text narrative entered by the inspector can be related to a description of people, things, time, place, and objects in the video to be detected, and can also be related to behaviors, actions, or events.

In some embodiments, please refer to FIG. 1 to FIG. 2, as shown in step 220, the processor 120 of the multimodal video detecting system 100 is configured to generate a plurality of detecting conditions according to the multimodal association result. However, it must be explained that the step 220 of present disclosure is not limited to being executed by the multimodal video detecting system 100 shown in FIG. 1. In some embodiments, the step 220 of present disclosure can be executed by other suitable systems or devices.

In some embodiments, the aforementioned detecting conditions are a piece of relevance descriptive data corresponding to the message to be detected, for example, in the video to be detected, the piece of relevance descriptive data is relevant explanations between people, events, time, place, and things can includes behaviors, actions, or events. In some embodiments, the aforementioned relevance descriptive data includes one or more than two of a behavior of a person, a behavior of an animal, an action of a person, an action of an animal, an facial expression of a person, an facial expression of an animal, an emotion of a person, an emotion of an animal, a relative position between a person and a place/building, a relative position between an animal and a place/building, a relative relationship between a person, other people, and things, and an event. An example will be provided for reference below.

For example, after the processor 120 is configured to analyze the language modality and visual modality in one video to be detected, the multimodal association result is "Someone is interviewed indoors in black clothes". The processor 120 is configured to set a first detecting condition as "Someone is interviewed" according to the multimodal association result. A second detecting condition is "Someone is indoors". A third detecting condition is "Someone is in black clothes". In a further aspect, if the processor 120 can analyze that someone is a man, the detecting conditions are added including "a man is interviewed", "a man is indoors, and "a man is in black clothes". If someone is a well-known person, and the processor 120 is further configured to compare and judge that someone is Mr. A, the detecting conditions are further added including "Mr. A is interviewed", "Mr. A is indoors", and "Mr. A is in black clothes".

In some embodiments, please refer to FIG. 1 to FIG. 3, as shown in step 230, the processor 120 of the multimodal video detecting system 100 is configured to search a plurality of videos (e.g., a video V1 and a video V2) in the video detection database 700 so as to obtain a target video (e.g., a video V1) in the plurality of videos according to the plurality of detecting conditions. Each of the plurality of videos includes a plurality of video paragraphs (e.g., a video paragraph P1 to a video paragraph PN) respectively. Each of the plurality of video paragraphs (e.g., a video paragraph P1 to a video paragraph PN) includes a piece of multimodal related data respectively. However, it must be explained that the step 230 of present disclosure is not limited to being executed by the multimodal video detecting system 100 shown in FIG. 1. In some embodiments, the step 230 of present disclosure can be executed by other suitable systems or devices.

It should be noted that the multimodal related data will be marked in the video paragraph (e.g., a video paragraph P1) at a corresponding time (e.g., a time T1) in a video in a tag form (e.g., a tag L1). To further illustrate, a time T1 of the aforementioned video paragraph P1 to a time TN of the aforementioned video paragraph PN are all 3 seconds. A time of the aforementioned video paragraph can be design according to actual needs, and are not limited to the embodiments of present disclosure. Furthermore, the aforementioned video paragraph P1 can be composed of one or more pictures. Similarly, each of the video paragraph P2 to the video paragraph PN can be composed of one or more pictures.

Then, the processor 120 of the multimodal video detecting system 100 is configured to compare the plurality of detecting conditions and the pieces of multimodal related data (e.g., a tag L1 to a tag LN) of video paragraphs to obtain a matching video paragraph (e.g., a video paragraph P3 with a tag L3) and use a video corresponding to the matching video paragraph as the target video.

For example, following the above example, the processor 120 is configured to search the plurality of videos in the video detection database 700 according to the three detecting conditions to compare the tag L1 of the video paragraph P1 to the tag LN of the video paragraph PN of the video V1 according to the three detecting conditions, and to compare the tag L1' of the video paragraph P1' to the tag LM of video paragraph PM of the video V2. After the processor 120 is configured to compare one by one, the processor 120 is configured to obtain a matching video paragraph P3, and use the matching video paragraph P3 corresponding to the video V1 as a target video.

In some embodiments, the processor 120 is further configured to compare the multimodal association result and the piece of multimodal related data of one of the video paragraphs of the target video so as to obtain a target video paragraph of the target video (e.g., a video paragraph P3).

The target video paragraph (e.g., a video paragraph P3) and the video to be detected are displayed on the display device 600 by the processor 120.

In some embodiments, please refer to FIG. 1 to FIG. 3, the piece of multimodal related data of the plurality of video paragraphs of the plurality of videos in the video detection database 700 is established by an implementation method. The implementation method will be explained below.

The implementation method to download the plurality of videos from a plurality of video databases (e.g., a video database 910 and a video database 930) so as to store the plurality of videos into the video detection database 700 by the server 800. Then, a plurality of modal characteristics of the plurality of video paragraphs P1 to PN of each of the plurality of videos V1 are identified by the server 800. The pieces of multimodal related data L1 to LN corresponding to the video paragraphs are generated by the server 800 according to the plurality of modal characteristics. Furthermore, the plurality of video paragraphs P1 to PN of each of the plurality of videos V1 are marked with the pieces of multimodal related data L1 to LN by the server 800 according to, and are stored in the video detection database 700. Specifically, the processor 120 can use the aforementioned technology for analyzing the video to be detected to analyze each of video paragraphs in the video database, and create the pieces of multimodal related data for each of video paragraphs to be stored as a tag in a text form. Content obtained by an analysis corresponds to a piece of relevance descriptive data corresponding to of video paragraphs, for example, related explanations of people, things, time, place, and objects in the video paragraphs, such as human behaviors, actions, facial expressions, etc.

In some embodiments, the aforementioned multimodal related data L1 to LN is that the server 800 generates text data after analyzing the relevance of various objects and events of a video and a voice content. The aforementioned multimodal related data L1 to LN are respectively maked in the plurality of video paragraphs P1 to PN according to a time T1 to TN of the video paragraphs.

In some embodiments, the aforementioned modal type of the plurality of modal characteristics includes one of a semantic recognition modality, a natural language recognition modality, a face recognition modality, a building recognition modality, an object recognition modality, a behavior recognition modality, a number recognition modality, and a color recognition modality. It should be noted that the aforementioned modal characteristics are various modalities analyzed by a correlation of various objects and various events of a video and a voice content. The types of modalities can be designed according to actual needs, and are not limited to the embodiments of the present disclosure.

In some embodiments, the processor 120 is configured to use the aforementioned implementation method to mark the pieces of multimodal related data L1 to LN respectively to the plurality of video paragraphs P1 to PN of each of the plurality of videos V1.

In some embodiments, please refer to FIG. 1 to FIG. 3, as shown in step 240, the processor 120 of the multimodal video detecting system 100 is configured to output the target video and the video to be detected to a display device 600 for display by the processor. However, it must be explained that the step 240 of present disclosure is not limited to being executed by the multimodal video detecting system 100 shown in FIG. 1. In some embodiments, the step 240 of present disclosure can be executed by other suitable systems or devices.

For example, following the above example, the processor 120 is configured to output the target video and the video to be detected to the display device 600 for display for review by inspectors.

It should be noted that an use of the multimodal video detecting system 100 and the multimodal method 200 for detecting a video of the present disclosure can accurately analyze an identity of a character or details of a character's behavior in a video. For example, after the video V1 is executed the multimodal method 200 for detecting a video by the processor 120 of multimodal video detecting system 100, the processor 120 is configured to analyze a description content of the video paragraph P2 to the video paragraph P3. The description content is that a well-known person gives a speech in a square in front of U.S. White House.

For example, after the video V1 is executed the multimodal method 200 for detecting a video by the processor 120 of multimodal video detecting system 100, the processor 120 is configured to analyze a description content of the video paragraph P1' to the video paragraph P2'. The description content is that a child yells for 11 seconds.

The aforementioned multimodal method 200 for detecting a video can be implemented as a computer program and stored in a computer-readable recording medium so that the computer reads the recording medium and executes the multimodal method 200 for detecting a video. The computer-readable recording medium can be read-only memories, flash memories, floppy disks, hard disks, CDs, flash drives, tapes, and databases that can be accessed over the Internet, or a computer readable recording medium with the same functions that can be easily thought of by those who are familiar with this technology.

Based on the above embodiments, the present disclosure provides a multimodal method for detecting a video, a multimodal video detecting system and a non-transitory computer readable medium so as to input videos and video video-related narratives to quickly search for and check related videos. The verification process using the multimodal video detection method of the present disclosure will save a lot of labor, time and other resources.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A multimodal method for detecting a video, comprising:
receiving a message to be detected so as to obtain a multimodal association result by a processor, wherein the message to be detected corresponds to a video to be detected, wherein the message to be detected further comprises a natural language text paragraph corresponding to the video to be detected, wherein receiving the message to be detected so as to obtain the multimodal association result by the processor comprises:
receiving the video to be detected and the natural language text paragraph corresponding to the video to be detected to obtain the multimodal association result by the processor;
generating a plurality of detecting conditions according to the multimodal association result by the processor;
searching a plurality of videos in a video detection database so as to obtain a target video in the plurality of videos according to the plurality of detecting conditions by the processor, wherein each of the plurality of videos comprises a plurality of video paragraphs respectively, wherein each of the plurality of video paragraphs comprises a piece of multimodal related data respectively;
comparing the plurality of detecting conditions and the piece of multimodal related data of the plurality of video paragraphs so as to obtain a matching video paragraph, and using a video corresponding to the matching video paragraph as the target video by the processor; and
outputting the target video and the video to be detected to a display device for display by the processor.

2. The multimodal method for detecting the video of claim 1, wherein the piece of multimodal related data of the plurality of video paragraphs is established by following steps:
downloading the plurality of videos from a plurality of video databases so as to store the plurality of videos into the video detection database by a server;
identifying a plurality of modal characteristics of the plurality of video paragraphs of each of the plurality of videos by the server;
generating the piece of multimodal related data corresponding to the plurality of video paragraphs according to the plurality of modal characteristics by the server; and
marking the plurality of video paragraphs of each of the plurality of videos according to the piece of multimodal related data of the plurality of video paragraphs so as to store the plurality of videos in the video detection database by the server respectively.

3. The multimodal method for detecting a video of claim 2, wherein a modal type of the plurality of modal characteristics comprises one of a semantic recognition modality, a natural language recognition modality, a face recognition modality, a building recognition modality, an object recognition modality, a behavior recognition modality, a number recognition modality, and a color recognition modality.

4. The multimodal method for detecting a video of claim 1, wherein the plurality of detecting conditions are a piece of relevance descriptive data corresponding to the video to be detected, wherein the piece of relevance descriptive data comprises one of a behavior of a person, a behavior of an animal, an action of a person, an action of an animal, an facial expression of a person, an facial expression of an animal, an emotion of a person, an emotion of an animal, a relative position between a person and a place/building, a relative position between an animal and a place/building, a relative relationship between a person, other people, and things, and an event.

5. The multimodal method for detecting the video of claim 1, wherein receiving the message to be detected so as to obtain the multimodal association result by the processor further comprises:
receiving the video to be detected by the processor;
identifying a plurality of modal characteristics of a plurality of video paragraphs of the video to be detected by the processor; and
obtaining the multimodal association result according to the plurality of modal characteristics and the natural language text paragraph by the processor.

6. The multimodal method for detecting the video of claim 5, wherein a modal type of the plurality of modal characteristics comprises one of a semantic recognition modality, a natural language recognition modality, a face recognition modality, a building recognition modality, an object recognition modality, a behavior recognition modality, a number recognition modality, and a color recognition modality.

7. The multimodal method for detecting the video of claim 1, further comprising:
comparing the multimodal association result and the piece of multimodal related data of one of the video paragraphs of the target video so as to obtain a target video paragraph of the target video by the processor; and
displaying the target video paragraph and the video to be detected to the display device by the processor.

8. A multimodal video detecting system, comprising:
a memory, configured to store a plurality of instructions; and
a processor, coupled to the memory, wherein the processor is configured to read the plurality of instructions to perform following steps:
receiving a message to be detected so as to obtain a multimodal association result, wherein the message to be detected corresponds to a video to be detected;
generating a plurality of detecting conditions according to the multimodal association result;
searching a plurality of videos in a video detection database so as to obtain a target video in the plurality of videos according to the plurality of detecting conditions, wherein each of the plurality of videos comprises a plurality of video paragraphs respectively, wherein each of the plurality of video paragraphs comprises a piece of multimodal related data respectively;
comparing the plurality of detecting conditions and the piece of multimodal related data of the plurality of video paragraphs so as to obtain a matching video paragraph and using a video corresponding to the matching video paragraph as the target video; and
outputting the target video and the video to be detected to a display device for display, wherein the message to be detected further comprises a natural language text paragraph corresponding to the video to be detected, wherein the processor is further configured to receive the video to be detected and the natural language text paragraph corresponding to the video to be detected to obtain the multimodal association result.

9. The multimodal video detecting system of claim 8, wherein the piece of multimodal related data of the plurality of video paragraphs is established by following steps:
downloading the plurality of videos from a plurality of video databases so as to store the plurality of videos into the video detection database by a server;
identifying a plurality of modal characteristics of the plurality of video paragraphs of each of the plurality of videos by the server;
generating the piece of multimodal related data corresponding to the plurality of video paragraphs according to the plurality of modal characteristics by the server; and
marking the plurality of video paragraphs of each of the plurality of videos according to the piece of multimodal related data of the plurality of video paragraphs so as to store the plurality of videos in the video detection database by the server respectively.

10. The multimodal video detecting system of claim 9, wherein a modal type of the plurality of modal characteristics comprises one of a semantic recognition modality, a natural language recognition modality, a face recognition modality, a building recognition modality, an object recognition modality, a behavior recognition modality, a number recognition modality, and a color recognition modality.

11. The multimodal video detecting system of claim 8, wherein the plurality of detecting conditions are a piece of relevance descriptive data corresponding to the video to be detected, wherein the piece of relevance descriptive data comprises one of a behavior of a person, a behavior of an animal, an action of a person, an action of an animal, an facial expression of a person, an facial expression of an animal, an emotion of a person, an emotion of an animal, a relative position between a person and a place/building, a relative position between an animal and a place/building, a relative relationship between a person and other people and things, and an event.

12. The multimodal video detecting system of claim 8, wherein the processor is further configured to receive the video to be detected to identify a plurality of modal characteristics of a plurality of video paragraphs of the video to be detected by the processor so as to obtain the multimodal association result according to the plurality of modal characteristics and the natural language text paragraph.

13. The multimodal video detecting system of claim 12, wherein a modal type of the plurality of modal characteristics comprises one of a semantic recognition modality, a natural language recognition modality, a face recognition modality, a building recognition modality, an object recognition modality, a behavior recognition modality, a number recognition modality, and a color recognition modality.

14. The multimodal video detecting system of claim 8, wherein the processor is further configured to compare the multimodal association result and the piece of multimodal related data of one of the video paragraphs of the target video so as to obtain a target video paragraph of the target video and the processor is configured to output the target video paragraph and the video to be detected to the display device.

15. A non-transitory computer readable medium, comprising a computer program, and configured to perform a multimodal method for detecting a video, wherein the multimodal method for detecting the video comprises:
receiving a message to be detected so as to obtain a multimodal association result by a processor, wherein the message to be detected is corresponds to a video to be detected, wherein the message to be detected further comprises a natural language text paragraph corresponding to the video to be detected, wherein receiving the message to be detected so as to obtain the multimodal association result by the processor comprises:
receiving the video to be detected and the natural language text paragraph corresponding to the video to be detected to obtain the multimodal association result by the processor;
generating a plurality of detecting conditions according to the multimodal association result by the processor;
searching a plurality of videos in a video detection database so as to obtain a target video in the plurality of videos according to the plurality of detecting conditions by the processor, wherein each of the plurality of videos comprises a plurality of video paragraphs respectively, wherein each of the plurality of video paragraphs comprises a piece of multimodal related data respectively;

comparing the plurality of detecting conditions and the piece of multimodal related data of the plurality of video paragraphs so as to obtain a matching video paragraph and using a video corresponding to the matching video paragraph as the target video by the processor; and outputting the target video and the video to be detected to a display device for display by the processor.

16. The non-transitory computer readable medium of claim 15, wherein the piece of multimodal related data of the plurality of video paragraphs is established by following steps:

downloading the plurality of videos from a plurality of video databases so as to store the plurality of videos into the video detection database by a server;

identifying a plurality of modal characteristics of the plurality of video paragraphs of each of the plurality of videos by the server;

generating the piece of multimodal related data corresponding to the plurality of video paragraphs according to the plurality of modal characteristics by the server; and marking the plurality of video paragraphs of each of the plurality of videos according to the piece of multimodal related data of the plurality of video paragraphs so as to store the plurality of videos in the video detection database by the server respectively.

* * * * *